(12) United States Patent
Onodera et al.

(10) Patent No.: US 10,457,267 B2
(45) Date of Patent: Oct. 29, 2019

(54) VALVE CONTROL SYSTEM CONFIGURED TO CONTROL AN OPENING AND CLOSING OF A VALVE DEVICE

(71) Applicant: DENSO CORPORATION, Kariya, Aichi-pref. (JP)

(72) Inventors: Hirofumi Onodera, Kariya (JP); Kunio Namba, Kariya (JP); Yasuo Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 169 days.

(21) Appl. No.: 15/838,737

(22) Filed: Dec. 12, 2017

(65) Prior Publication Data

US 2018/0170343 A1 Jun. 21, 2018

(30) Foreign Application Priority Data

Dec. 16, 2016 (JP) ................................. 2016-244923

(51) Int. Cl.
| | |
|---|---|
| *G01M 15/04* | (2006.01) |
| *B60W 10/24* | (2006.01) |
| *B60K 28/10* | (2006.01) |
| *B60K 15/035* | (2006.01) |
| *F02D 41/22* | (2006.01) |
| *B60K 15/05* | (2006.01) |
| *B60K 15/03* | (2006.01) |
| *F02M 25/08* | (2006.01) |

(52) U.S. Cl.
CPC ........... *B60W 10/24* (2013.01); *B60K 15/035* (2013.01); *B60K 28/10* (2013.01); *B60K 2015/0321* (2013.01); *B60K 2015/03026* (2013.01); *B60K 2015/03585* (2013.01); *B60K 2015/0546* (2013.01); *F02D 2041/225* (2013.01); *F02M 25/0809* (2013.01); *F02M 25/089* (2013.01); *F02M 25/0836* (2013.01); *F02M 2025/0845* (2013.01)

(58) Field of Classification Search
USPC ......................................... 73/114.38, 114.39
See application file for complete search history.

(56) References Cited

U.S. PATENT DOCUMENTS

| | | | |
|---|---|---|---|
| 2005/0155587 A1* | 7/2005 | Suzuki | ............... F02D 41/0002 123/520 |
| 2015/0027571 A1* | 1/2015 | Kishi | .................... F16K 15/18 137/614.2 |

(Continued)

FOREIGN PATENT DOCUMENTS

JP 2015-102009 6/2015

*Primary Examiner* — Eric S. McCall
(74) *Attorney, Agent, or Firm* — Nixon & Vanderhye PC

(57) ABSTRACT

A controller controls a valve device for opening and closing of a passage to control a flow of evaporative fuel evaporating and flowing from a fuel tank. The valve device includes a valve body housed in the passage to open and close the passage, a biasing member biasing the valve body to close the passage, and a driver driving the valve body to open the fuel passage. The controller includes a detector detecting load of the driver and a determiner to determine the position of the valve body. The determiner determines that the passage is open when a magnitude of the change of the driver load is equal to or greater than a threshold value. The controller accurately detects an open valve position without detecting an internal pressure change of the fuel tank.

7 Claims, 18 Drawing Sheets

(56) References Cited

U.S. PATENT DOCUMENTS

2015/0143996 A1    5/2015  Kimoto et al.
2018/0274494 A1*  9/2018  Fukui ................. F02M 25/0836
2018/0372028 A1*  12/2018  Nakata .................. F02M 25/08

* cited by examiner

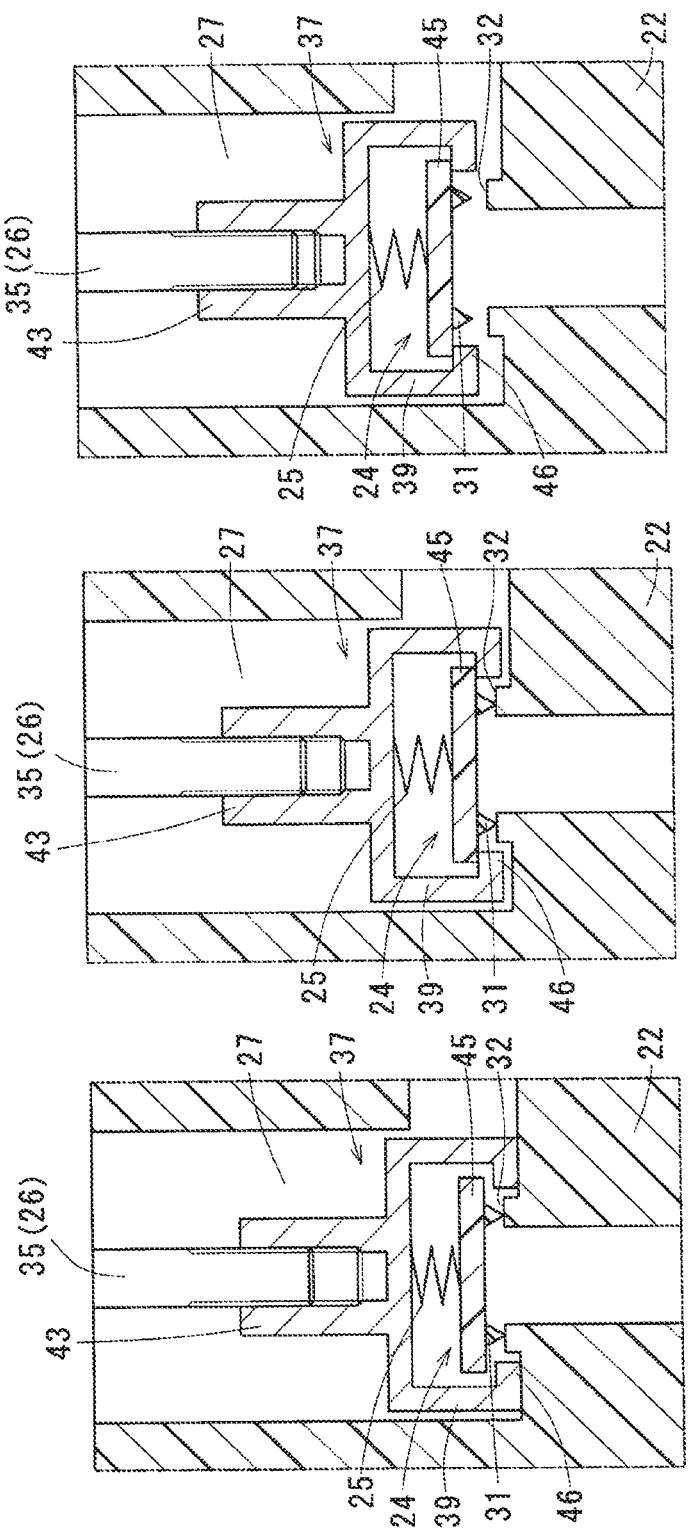

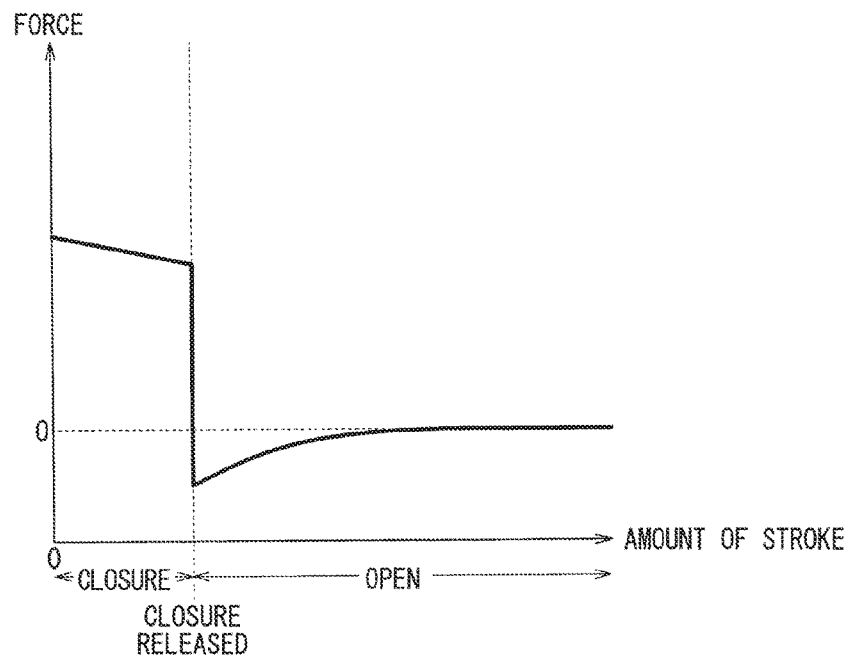
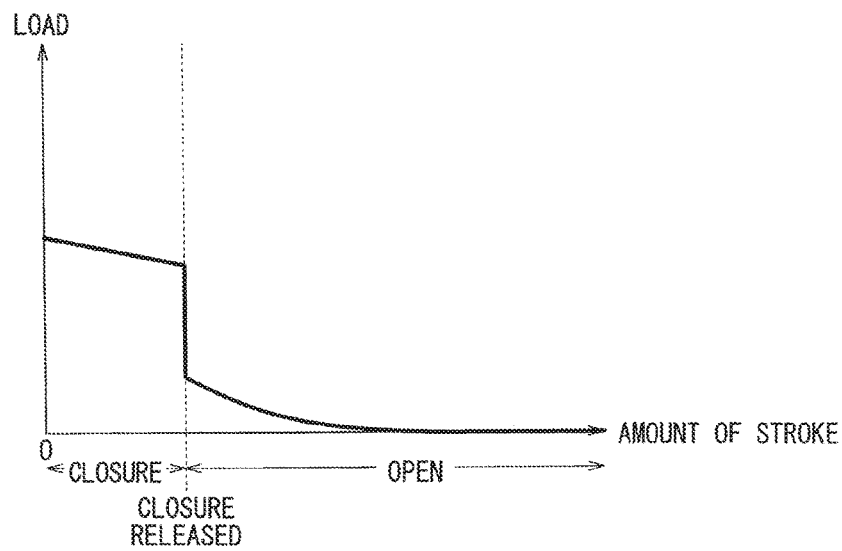

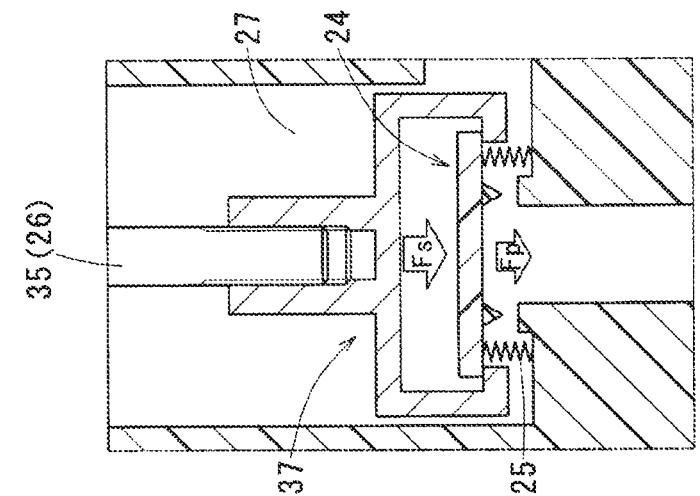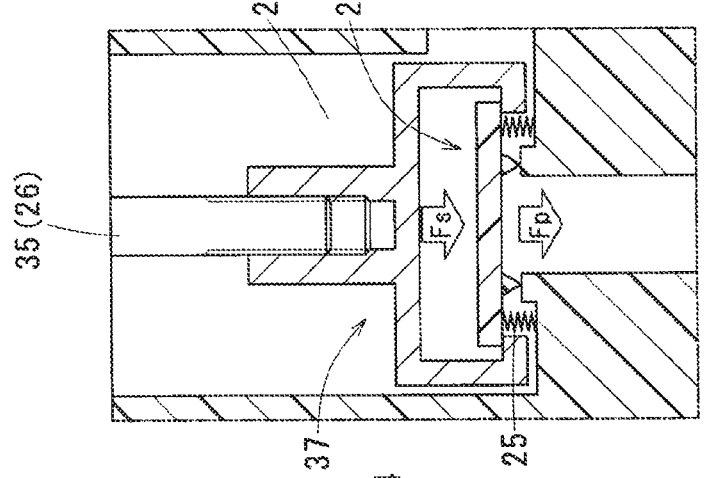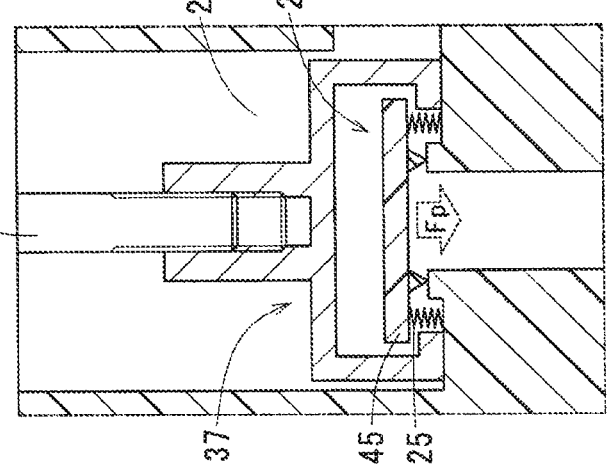

VALVE CONTROL SYSTEM CONFIGURED TO CONTROL AN OPENING AND CLOSING OF A VALVE DEVICE

CROSS REFERENCE TO RELATED APPLICATION

The present application is based on and claims the benefit of priority of Japanese Patent Application No. 2016-244923, filed on Dec. 16, 2016, the disclosure of which is incorporated herein by reference.

TECHNICAL FIELD

The present disclosure generally relates to a controller to control a valve device.

BACKGROUND INFORMATION

Conventionally, a valve device may include: a passage formation member defining a fuel passage for the flow of evaporative fuel evaporating in a fuel tank; a valve body housed in the passage to open and close the fuel passage; a biasing member biasing the valve body to close the passage; and a valve driver driving the valve body to an open position by providing enough force to the valve body to overcome the closing force of the biasing member.

The valve body of such a valve device may include a region of play or "play region" to more securely close the passage, where the closure state of the valve is maintained when the valve body is in the play region. That is, driving the valve body in the play region will not open the valve until the valve body is driven through the play region and past a closure release position.

When opening the passage, the valve body is driven through the play region at high speed, and the driving speed of the valve body is decreased after passing a closure release position and the valve is further driven at the lower speed to preset degree of opening, to more quickly open of the passage to a preset degree.

The driving speed is decreased after passing the closure release position to limit and/or prevent a steep inflow and outflow of the evaporative fuel accompanying the quick opening of the passage.

In order to quickly open the passage to the preset degree, both the play region and the closure release position should be accurately determined.

However, some parts of the valve body, such as rubber parts and parts of other elastic materials, may change shape over time and from use, such as from material abrasion, compression, and the like, which may cause a variation in the closure release position. Therefore, it may be necessary to adjust the closure release position over time.

The adjustment of the closure release position in the valve device based on determining an accurate position is disclosed in patent document 1 (i.e., Japanese Patent Laid-Open No. 2015-102009). In the configuration described in patent document 1, the accurate position determination is performed every time the vehicle is started, by driving the valve body toward the opening direction bit by bit, and by detecting an internal pressure of the fuel tank.

However, in order to determine the closure release position in patent document 1, the determination device observes the internal pressure of the fuel tank for a certain period of time after driving the valve body in the opening direction, in order to consider the delay of the internal pressure change when the passage is opened. That is, the technique in the patent document 1 takes time to accurately determine the closure release position. Because the internal pressure change is so small when the passage is initially opened, i.e., when the passage is opened to a small degree, the detection of even a nominal internal pressure change is a time consuming process.

SUMMARY

It is an object of the present disclosure to provide a controller of a valve device to quickly determine and detect a closure release position of a valve body.

In an aspect of the present disclosure, a controller is configured to control the opening and closing of a valve device. The controller may include a driver circuit for outputting a drive signal to a driver to control a driving of a valve body between a closed position, a closure release position, and an open position, and for releasing a closure of a valve passage by driving the valve body from the closure release position to the open position. The controller may further include a detector for detecting a load of the driver and a determiner for determining whether the closure of the valve passage is released. The determiner may determine that the closure of the passage is released when a magnitude of a change to the load of the driver is equal to or greater than a threshold value.

By using the above-described configuration of the present disclosure, the closure release position may be accurately detected without detecting the internal pressure change of the fuel tank.

Even though in the present disclosure a certain amount of time may pass before an internal pressure change after opening the passage can be detected, the driving force of the driver, or more specifically the change in the driving force applied by the valve driver, is instantly detectable, and the closure release position can be quickly determined.

That is, the controller of the valve device in the present disclosure is configured to detect and determine the closure release position in a short amount of time.

The closure release position indicates a valve opening start position in the valve device. In other words, the closure release position is a position of the valve body where the valve body moves from a closed position closing the passage to the flow of evaporative fuel to an open position where evaporative fuel is allowed to flow through the passage. The closure release position may be a position in the play region of the valve device before the valve device moves from a closed position to an open position, that is, as a valve device moves to an open position, the valve device may move from a closed position into a play region, to a closure release position, and then to an open position.

BRIEF DESCRIPTION OF THE DRAWINGS

Objects, features, and advantages of the present disclosure will become more apparent from the following detailed description made with reference to the accompanying drawings, in which:

FIG. 3A illustrates the valve device in a closure state or closed position;

FIG. 3B illustrates the valve device in a closure release state or closure release position;

FIG. 3C illustrates the valve device in an open state or open position;

FIG. 9A is a graph of an application force acting on the valve body guide when the fuel tank is at a negative pressure;

FIG. 9B is a graph of a load of the output shaft when the fuel tank is at a negative pressure;

FIG. 15A illustrates an application force acting on the valve body guide in the closure state with the fuel tank at a negative pressure;

FIG. 15B illustrates an application force acting on the valve body guide in the closure release state with the fuel tank at a negative pressure;

FIG. 15C illustrates an application force acting on the valve body guide in the open state with the fuel tank at a negative pressure;

DETAILED DESCRIPTION

Hereafter, the embodiments for implementing the present disclosure are described based on the drawings. The exemplary embodiments described herein are for illustrative purposes and not intended to limit the disclosure.

First Embodiment

Figure 1:
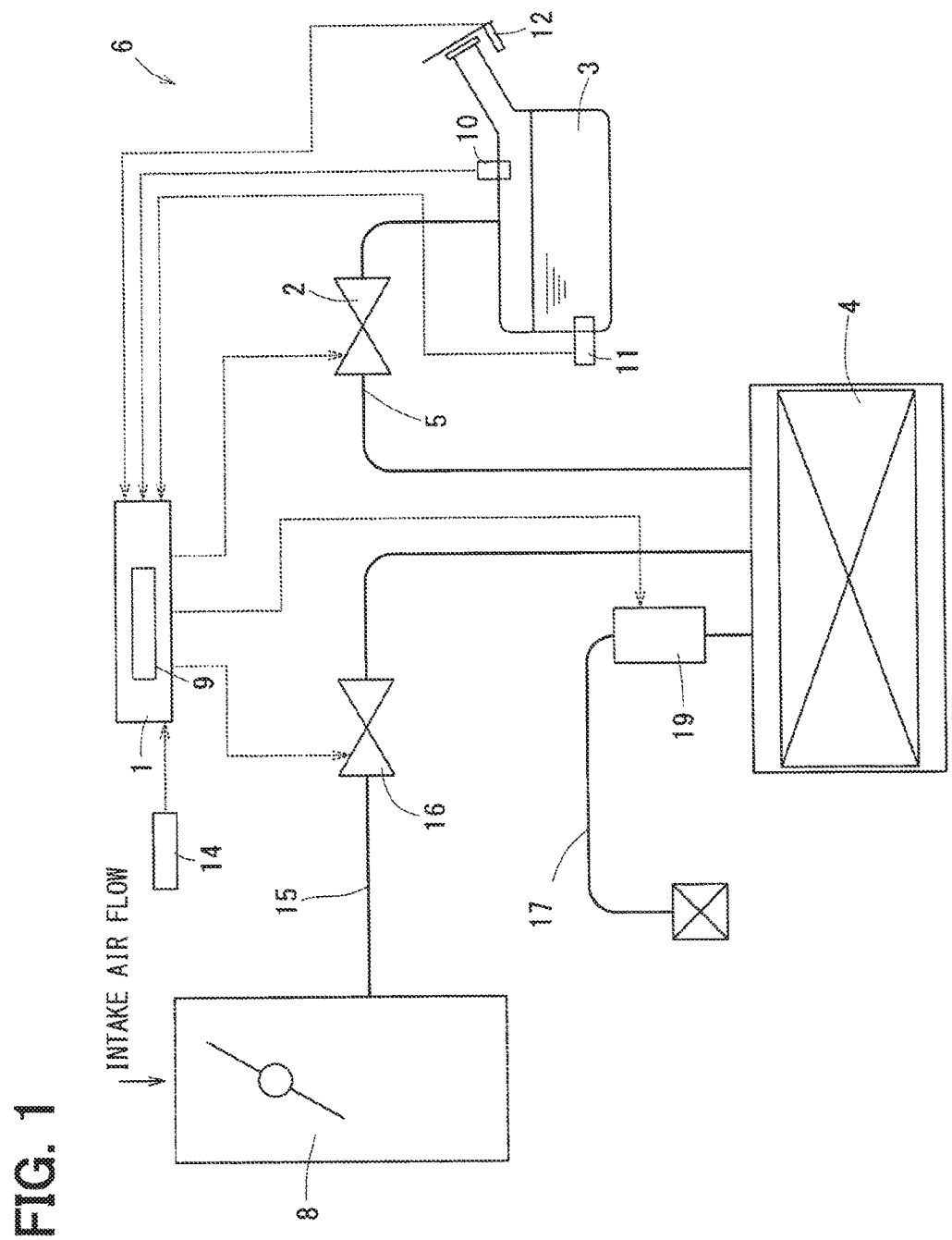
FIG. 1 illustrates a block diagram of an evaporative fuel process device.
Figure 2:
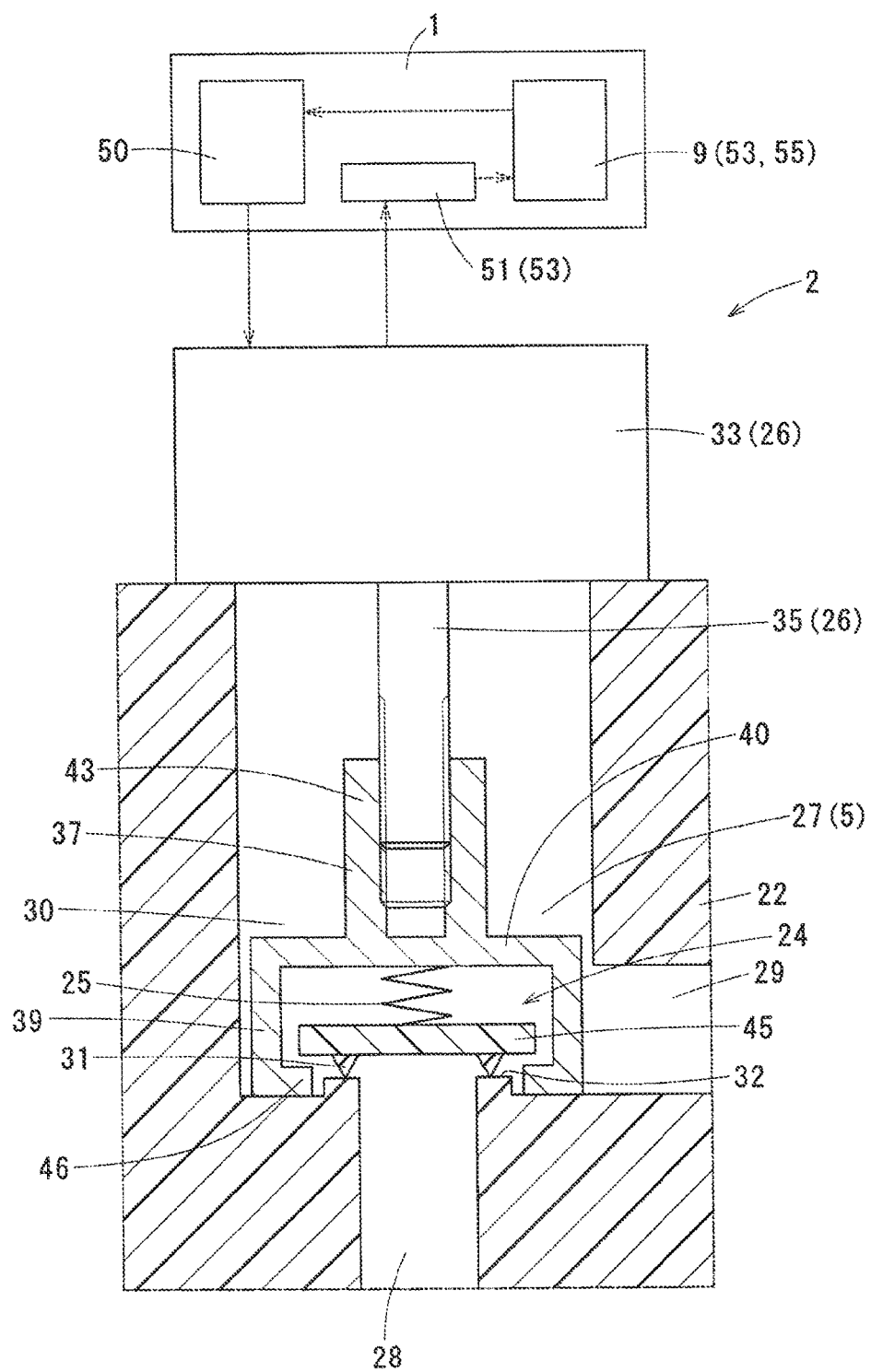
FIG. 2 illustrates a block configuration of a controller and a diagram of a valve device.

With reference to FIGS. 1 and 2, the configuration of a valve device 2 controlled by a controller 1 of the first embodiment of the present disclosure is described.

With reference to FIG. 1, the valve device 2 opens and closes an evaporative fuel passage 5 to canister 4 to collect evaporative fuel generated in a fuel tank 3. The valve device 2, canister 4, and the evaporative fuel passage 5 are components of an evaporative fuel processing unit 6 disposed in a vehicle.

The evaporative fuel processing unit 6 controls the flow of evaporative fuel from canister 4 so that evaporative fuel from the fuel tank 3 stored in the canister 4 can flow to an air intake passage 8 for purging during the operation of an internal-combustion engine (not shown).

The controller 1 may not only control the operation of various electric components of the fuel processing unit 6, but also control an operation of the internal-combustion engine.

The controller 1 may receive signals from various in-vehicle sensors that indicate a drive and control state of the internal-combustion engine. The controller 1 includes an input circuit for processing the signals from these sensors, a CPU 9 for performing a control process and an arithmetic process for controlling the engine, memory of various kinds for storing and holding data and programs for controlling the engine, and an output circuit for outputting an engine control signal based on the processing results by the CPU 9.

The fuel tank 3 stores a liquid fuel, such as gasoline or the like. Evaporated fuel in the gaseous phase may rise to an upper area of the fuel tank 3. That is, as the liquid fuel evaporates, the gaseous fuel may accumulate in the upper portion of the fuel tank 3 over the liquid fuel. The fuel tank 3 may be provided with a pressure sensor 10 serving as a pressure detector for detecting an internal pressure of the upper space of the tank 3. The fuel tank 3 may also include a temperature sensor 11 for detecting a temperature of the liquid fuel. The pressure values and temperature values measured respectively by sensors 10 and 11 may be output to controller 1 and processed by controller 1 for use in the control processes performed by the controller 1.

Other sensors may also output signals to the controller 1, such as a gas cap sensor 12 for detecting the presence of a gas cap covering a liquid fuel ingress passage into the fuel tank 3. Other sensors may also include an engine revolution (rpm) sensor 14 for detecting a number of revolutions of the internal-combustion engine.

The canister 4 may contain an adsorptive material such as activated carbon for the adsorption of the evaporative fuel from the fuel tank 3. The canister 4 is connected to the upper area of the fuel tank 3 via the evaporative fuel passage 5. The canister 4 is also connected to a negative pressure generation range of the air intake passage 8 via a purge passage 15. More specifically, the purge passage 15 is located downstream of a throttle valve air intake.

The purge passage 15 may be provided with a purge valve 16 that opens and closes to control the flow of evaporative fuel from the canister 4 to air intake passage 8. The purge valve 16 may also control the degree of opening of the purge valve 16, that is, the control valve 16 may adjust the degree of opening of the control valve 16.

The canister 4 may also be connected to the outdoor atmosphere via an atmosphere introduction passage 17. The atmosphere introduction passage 17 is provided with a leak diagnosis device 19, for example, disposed inline with the atmosphere introduction passage 17.

The leak detection device 19 determines whether there is any leakage from an evaporative fuel flow passage and is controlled by the controller 1. The leak detection device 19 is provided with an air intake valve that opens and closes the atmosphere introduction passage 17. The leak detection device 19 also includes an electric air pump. Leak detection of the evaporative fuel flow space is performed, for example, by fully closing the valve device 2, the purge valve 16, and the air introducing valve and operating the electric air pump to decompress the closed space in the evaporation fuel processing unit 6. That is, the leak detection device 19 evacuates air from the closed space in the evaporation fuel processing unit 6.

The valve device 2 is described with reference to FIG. 2.

In the following description, directional indicators such as up, down, right, and left, top, above, under, and the like, as these directions relate to the drawings, may be used to indicate a direction and an arrangement of the components for the ease of the description. In such case, the directional indicators refer only to the relevant drawing, and not to the actual installment position of the valve device 2.

The valve device 2 is a flow control valve that may close the evaporative fuel passage 5 during a valve closure state (i.e., the valve body is in a closed position), and controls an amount of fluid flow when the evaporative fuel passage 5 is in a valve open state (i.e., the valve body is in an open position).

The valve device 2 includes a passage formation member 22, a valve body 24, a biasing member 25, and a driver 26, all of which are described in greater detail below.

The passage formation member 22 is used to form the evaporative fuel passage 5 into an L-shaped passage, in which fuel or fluid flows in the L-shape bent passage 27. The evaporative fuel passage 5 and L-shaped passage may be referred to herein simply as a "passage" 27.

The passage formation member 22 is provided with an inlet pass 28 connected to the fuel tank 3 via a connection such as a tubing or pipe. The passage formation member 22 also includes an outlet pass 29 connected to the canister 4 via a connection.

The valve body 24 is accommodated in a cylinder-shape valve chamber 30 of the passage 27 and used to open and close the passage 27.

A lower end of the valve body 24 includes a rubber seal 31. The passage 27 is opened by unseating the rubber seal 31 from a valve seat 32, and closed by seating the rubber seal 31 to the valve seat 32. The valve seat 32 is formed at a periphery of an upper end opening of the inlet pass 28.

The biasing member 25 biases the valve body 24 downward to close the passage 27. In other words, the biasing member 25 urges the valve body in a closing direction to close the passage 27.

The driver 26 is, for example, a stepper motor to provide a driving force to drive the valve body 24 upward, in an opening direction or a closure release direction, to open the passage 27. The driver 26 provides a driving force to overcome the biasing force of the biasing member 25 to move the valve body 24 upward to the closure release state or closure release position, and further to the open state or open position.

The driver 26 has a motor body 33 disposed at an upper part of the formation member 22 and an output shaft 35 projecting from an undersurface of the motor body 33 and extending into valve chamber 30. The motor body is configured to rotate the output shaft 35 in both directions, that is, in both a clockwise and counterclockwise direction. The output shaft 35 is concentrically arranged in the valve chamber 30 and has a threaded outer surface.

A valve body guide 37 is disposed at a position between the output shaft 35 and the valve body 24 and acts as a connection portion of the valve body 24 to the output shaft 35. The valve body guide 37 allows the output shaft 35 to drive the valve body 24.

The valve body guide 37 has a capped cylindrical shape that includes a head or cap part 39 in a cylindrical shape with a hollow cylindrical cavity therein, and an upper wall part 40 that encloses an upper end of the cap part 39. Toward the center of the upper wall part 40, a cylindrically-shaped stem part 43 extends upward along a longitudinal axis of the valve body 24. An inner portion of stem part 43 is internally threaded to mate with the external threads on the output shaft 35. The valve body guide 37 is movably arranged along an axial direction in a rotation restricted state, that is the valve body guide 37 does not rotate, but rather moves linearly in an axial direction.

The externally threaded surface of the output shaft 35 (i.e., male screw portion) of the driver 26 engages the internal threads (i.e., female screw portion) of the stem part 43 of the valve body guide 37 to form a linkage, whereby the linkage operates to move the valve body guide 37 linearly in an up-down direction based on the rotation of the output shaft 35. For example, the linkage between the output shaft 35 and the valve body guide 37 may be similar to a lead screw or translational screw linkage where a rotational movement can be translated into a linear motion.

The valve body 24 has a base 45 made of resin and having a disc-like shape. The rubber seal 31 is provided on the under surface of base 45.

The valve body 24 is concentrically arranged within the valve body guide 37 and both the valve body guide 37 and the valve body 24 are arranged within passage 27, such that the rubber seal 31 abuts the valve seat 32 when the valve body 24 is positioned to seat the rubber seal 31 to the valve seat 32.

The lower end of the valve body guide 37 includes an annular-shaped projection 46 that projects in a radially-inward toward the longitudinal axis of the valve body guide 37.

The valve body 24 and the valve body guide 37 are arranged to move relative to one another, linearly, by a preset length, in an up-down direction. When the valve body 24 is seated to the valve seat 32, as the valve body guide 37 moves upward such that the annular projection 46 contacts an outer periphery of the under surface of valve body 24, for example, by contacting the under surface of base 45, the valve body 24 and the valve body guide 37 move upward together to open, i.e., to release the closure of, the passage 27 by the valve body 24.

The biasing member 25 may be a coil spring concentrically disposed within the valve body guide 37 and interposed between the upper wall part 40 of the valve body guide 37 and the base 45 of the valve body 24. That is, the biasing member 25 connects to the under surface of the upper wall part 40 and the upper surface of the base 45. The biasing member 25 may be compressed so as to exert a biasing force, or spring force, on the upper wall part 40 and the base part 45.

The biasing member 25 is positioned within the valve body guide 37 to exert a spring force and bias the base 45 toward the annular projection 46 of valve body guide 37. That is when the valve body 37 is moved downward in passage 27 to contact the passage forming member 22, the biasing member 25 biases the base 45 toward the valve seat 32 to seat the rubber seal 31.

An example of the basic operation of the valve device 2 is described with reference to FIGS. 3A, 3B, and 3C.

The valve device 2 rotates the driver 26 by a predetermined number of steps based on the output from the controller 1. Based on the rotation of the driver 26 by the predetermined number of steps, the valve body guide 37 moves by a predetermined amount of stroke in an up-down direction by the screw effect between the threaded output shaft 35 and the internal threading of the stem part 43 of the valve body guide 37.

The stroke amount of the valve device 2 of the current embodiment for example, is about 5 mm or 200 steps (i.e., incremental rotations by the driver 26). Such a stroke amount allows the valve device 2 to position the valve body 24 and the valve body guide 37 into a full open position relative to passage 27.

As shown in FIG. 3A, the valve device 2 may be positioned in an initial state with the annular projection 46 of the valve body guide 37 in contact with the passage formation member 22. In this state, the annular projection 46 encircles the valve seat 32. The base 45 of the valve body 24 is positioned above the annular projection 46 of the valve body guide 37, and the rubber seal 31 of the valve body 24 is pressed against the valve seat 32 by the biasing force of the biasing member 25. That is, the passage 27 is held in a closure state.

The closure state is defined as the 0 step, and the amount of stroke at such step is defined as 0 mm. That is, the positions/states of the valve device 2 (i.e., closed, closure release, and open), as measured by a stroke amount or step count by the controller 1, are based on the closure state or closed position where stroke amount is equal to 0.0 mm and the step count or step is equal to zero.

In a vehicle stop state or the like, the driver 26 may be rotated from the initial state (i.e., zero "0" steps) by four steps in the valve opening direction, for example. Thereby, the valve body guide 37 moves upward by about 0.1 mm by the linkage between the threaded output shaft 35 and internally threaded stem part 43. When the valve body guide 37 is slightly raised, for example, the valve body guide 37 is positioned in a release state where the valve body guide 37 no longer contacts or abuts the passage formation member 22. In such manner, by slightly raising the valve body guide 37, the additional forces caused by atmospheric changes acting on the valve body guide 37 when in contact with the passage formation member 22, can be limited or prevented, for example, to limit or prevent damage to the valve body guide 37.

Notable however, is that while the valve body guide 37 is in the slightly raised, release state, the rubber seal 31 remains pressed against the valve seat 32 by the biasing force of the biasing member 25 to maintain the closure state of the passage 27. That is, the passage 27 remains closed when the valve body guide 37 is positioned to the release state.

As shown in FIG. 3B, when the driver 26 further rotates in the valve opening direction from the release position (i.e., four steps), the valve body guide 37 continues to move upward based on the linkage and translation forces between the threads, and the annular projection 46 of the valve body guide 37 contacts the under surface of the base 45 of the valve body 24.

That is, an operation of the valve device 2 to move the valve body 25 and the valve body guide 37 from the position shown in FIG. 3A to the position shown in FIG. 3B, maintains the closure state of the valve device 2 regardless of the driving of the driver 26, and such a state of operation is considered as the play region of operation. That is, moving the valve device 2 (i.e., the valve body 25 and the body guide 37) from the position shown in FIG. 3A to the position shown in FIG. 3B, illustrates the play region of the valve device 2, that is, the range of positions between the closure state/closed position of the valve device 2 shown in FIG. 3A and the closure release state/closure release position shown in FIG. 3B.

With reference to FIG. 3C, when the driver 26 rotates further in the valve opening direction, to move the valve body guide 37 upward, the valve body guide 37, still in contact with the valve body 24, moves the valve body 24 upward together with the valve body guide 37 and the rubber seal 31 separates from the valve seat 32. Thereby, the passage 27 is opened.

As used herein the valve states and positions corresponding to the positions of the valve body guide 37 and the valve body 24 shown in FIGS. 3A, 3B, and 3C may be respectively designated as a closure state or closed position, a closure release state or closure release position, and an open state or open position.

Pressure from the fuel tank 3 may affect a load (i.e., force) on the output shaft 35, and may be described in terms of either a positive internal pressure case or a negative internal pressure case, based on the internal pressure of the fuel tank 3.

As used herein, the load may refer to the load on the output shaft as exerted by the driver 26, that is, the load on the output shaft may be the load exerted by the driver. In this case, the driver load may be synonymous with the output shaft load.

The internal pressure of the canister 4 may be kept at the atmospheric pressure. That is, the internal pressure of the canister 4 is the atmospheric pressure.

A case of positive internal pressure acting on the output shaft 35, that is, when the internal pressure of the fuel tank 3 is a positive pressure, is described with reference to FIGS. 4A, 4B, 4C, 5A, 5B, 6A, and 6B.

Figure 4A:
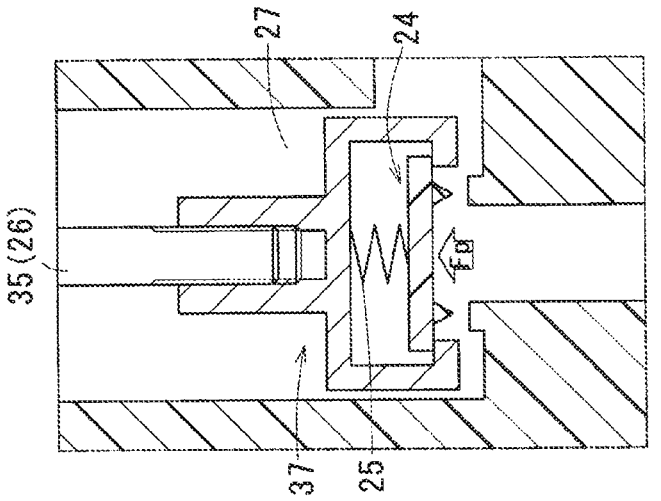
FIG. 4A illustrates an application force acting on a valve body guide in the closure state with a positive fuel tank pressure.

With reference to FIG. 4A, the force acting on the valve body guide 37 when the valve body guide 37 is in the closure state or closed position is a sum of a force Fp and a force Fs. That is, the force is a combination of the force Fs by the biasing member 25 and the positive internal pressure Fp of the fuel tank 3 acting on the lower surface of base 45 of the valve body 24, both of which urge the guide 37 upward.

Figure 4B:
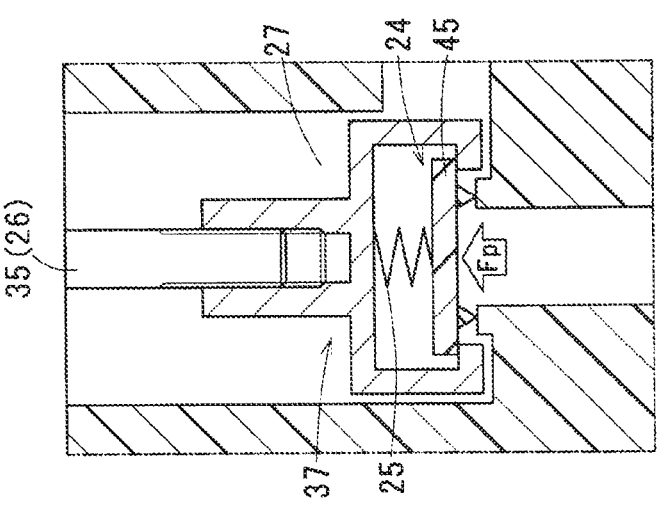
FIG. 4B illustrates an application force acting on the valve body guide in the closure release state with a positive fuel tank pressure

With reference to. FIG. 4B, in the closure release state, when the valve body guide 37 rises to contact the valve body 24 so that the valve body guide 37 and the valve body 24 move together, the force Fs is cancelled and only force Fp acts on the valve body guide 37.

Figure 4C:
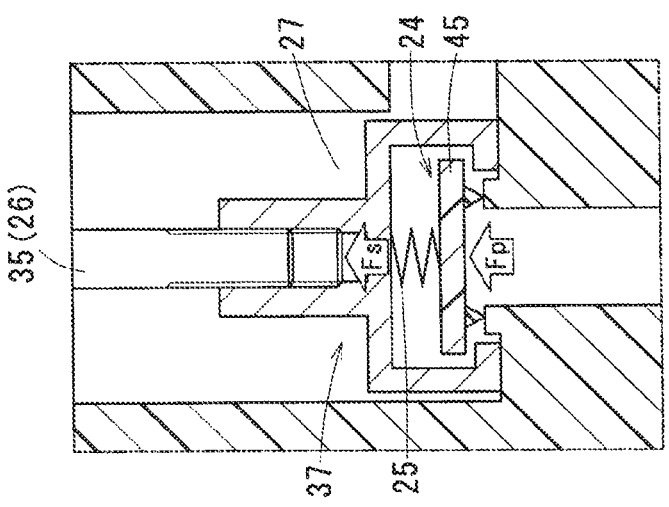
FIG. 4C illustrates an application force acting on the valve body guide in the open state with a positive fuel tank pressure.

With reference to FIG. 4C, similar to the closure release state in FIG. 4B, only force Fp acts on the valve body guide 37 when the valve body is in the open state or open position. However, as shown by the smaller Fp arrow in FIG. 4C, the magnitude of the force Fp gradually decreases when passage 27 is opened and the valve body 24 and the valve body guide 37 are in the open state/position.

The force or forces acting on the valve body 24 and the valve body guide 37 may also be designated herein as the "application force." For example, force Fs may act alone on the valve body guide 37 as an application force. In another example, the total force, that is, the combination of forces Fp and Fs, may also act on the valve body 37 as an application force.

Figure 5A:
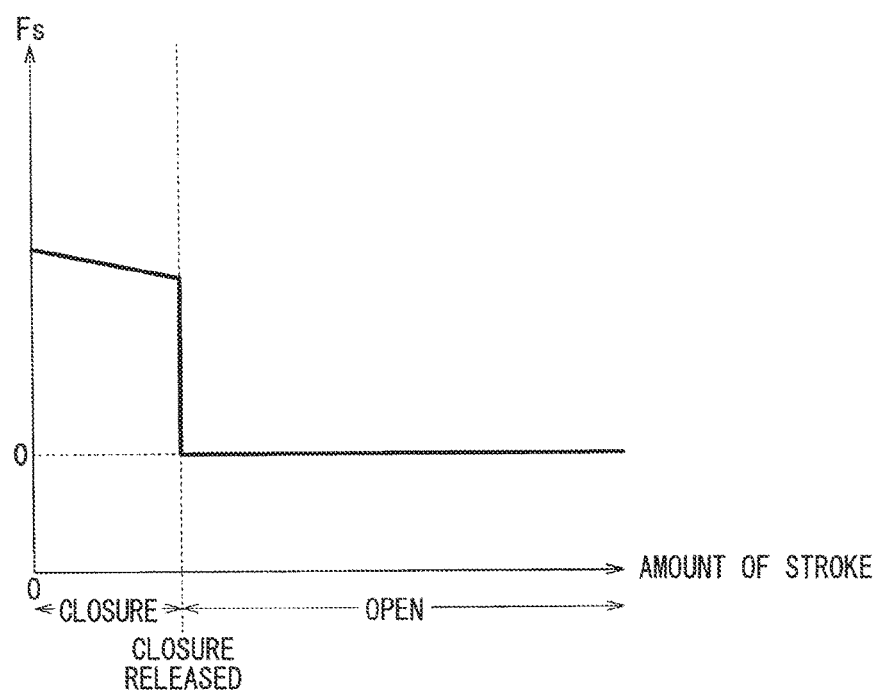
FIG. 5A is a graph of an application force of a biasing member on the valve body guide when the fuel tank is at a positive pressure.
Figure 5B:
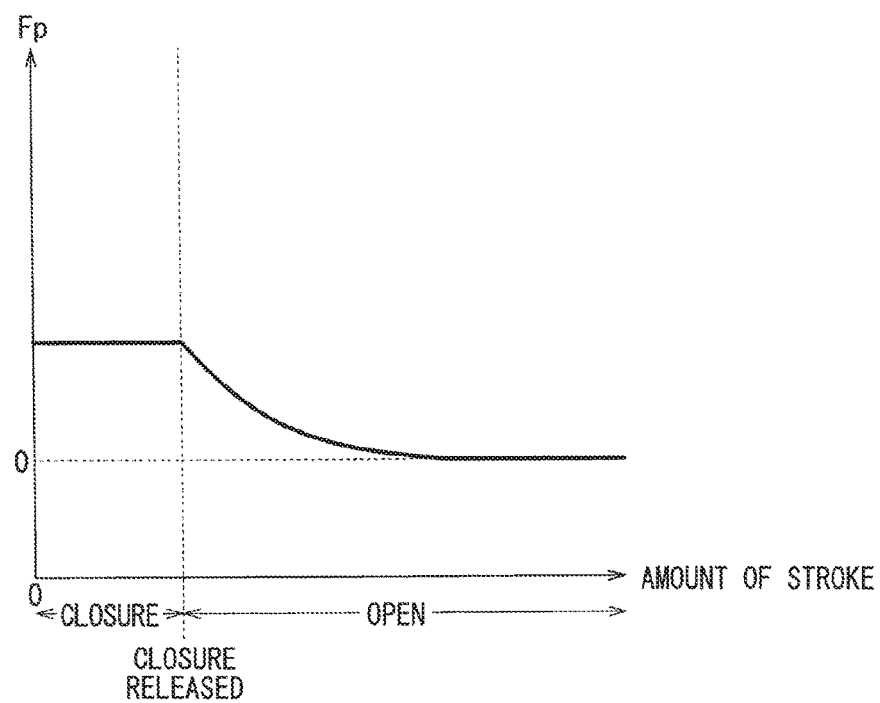
FIG. 5B is a graph of an application force acting on the valve body guide when the fuel tank is at a positive pressure.

In FIGS. 5A and 5B, a relationship between the forces Fs and Fp acting on the guide 37 and the amount of stroke of the guide 37 is illustrated, in which an upward force is shown a positive value and a downward force is shown a negative value. Note that, in the closure state of FIG. 5A, since the force Fs is caused by the displacement of the biasing member 25 by a spring that extends from a compressed state, the magnitude of the force Fs decreases the stroke amount increases.

Figure 6A:
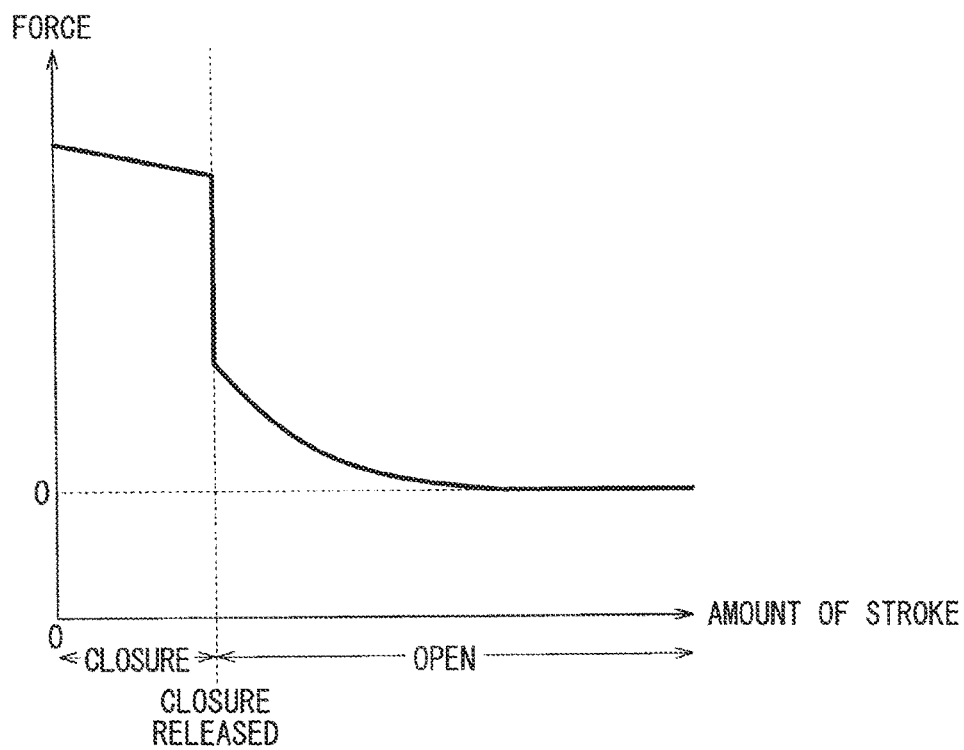
FIG. 6A is a graph of an application force acting on the valve body guide when the fuel tank is at a positive pressure.

As shown in FIG. 6A, the force acting on the valve body guide 37 is assumed as one force.

Figure 6B:
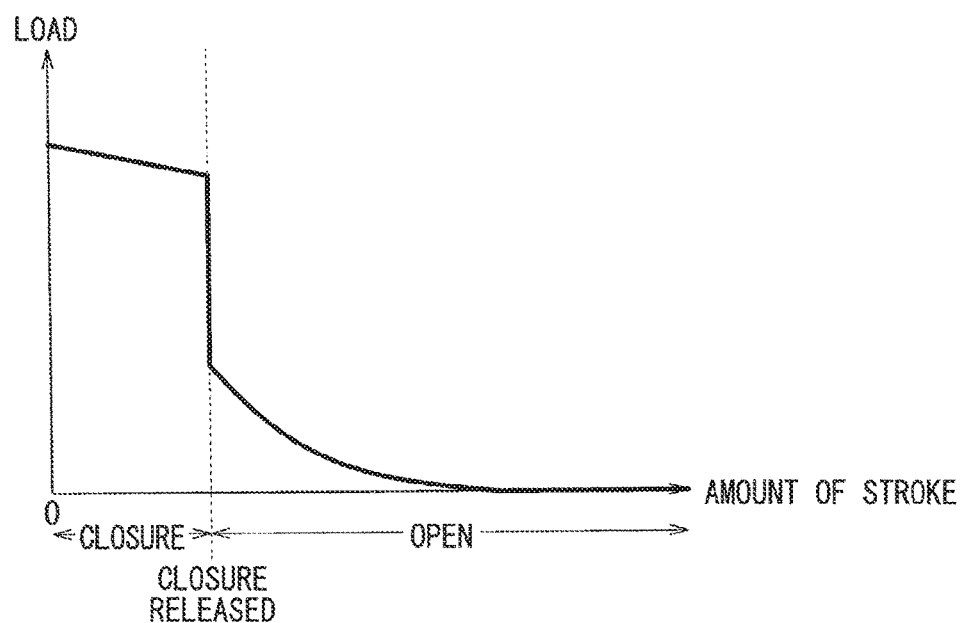
FIG. 6B is a graph of a load of an output shaft when the fuel tank is at a positive pressure.

In FIG. 6B, the load of the output shaft 35, which is in proportion to an absolute value of the force acting on the guide 37, is illustrated. As shown in FIG. 6B, the load of the output shaft 35 largely changes in the closure release state.

The case of negative internal pressure, that is,—when the internal pressure of the fuel tank 3 is negative, is described with reference to FIGS. 7A, 7B, 7C, 8A, 8B, 9A, and 9B.

Figure 7A:
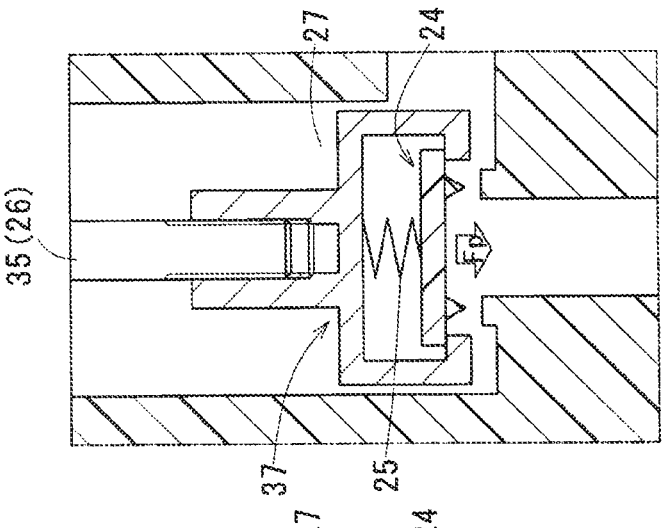
FIG. 7A illustrates an application force to the valve body guide in the closure state with a negative fuel tank pressure.

With reference to FIG. 7A, in the closure state or the closed position, when there is a negative pressure in the fuel tank 3, the only force acting on the valve body guide 37 is the upward force Fs, since the suction force acting on the valve body 24 to urge the valve body 24 downward does not act of the valve body guide 37.

Figure 7B:
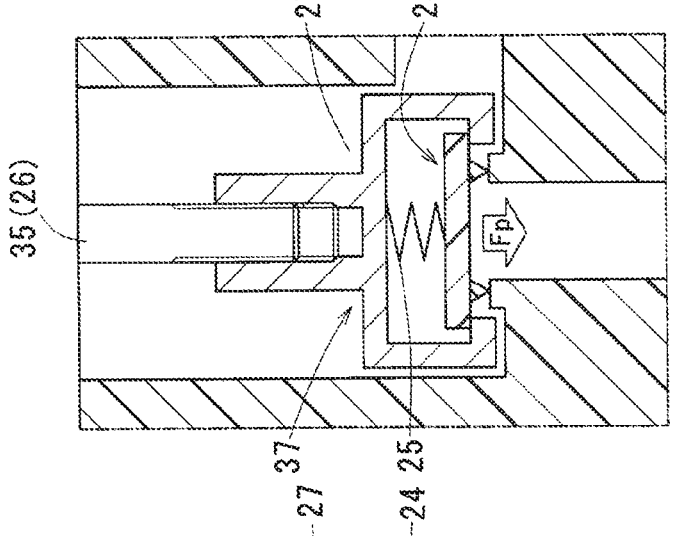
FIG. 7B illustrates an application force to the valve body guide in the closure release state with a negative fuel tank pressure.

With reference to FIG. 7B, in the closure release state, the force Fs disappears due to the valve body guide 37 and the valve body 24 moving as one body, and only force Fp acts on the valve body guide 37 as a downward, suction force caused by the negative pressure.

Figure 7C:
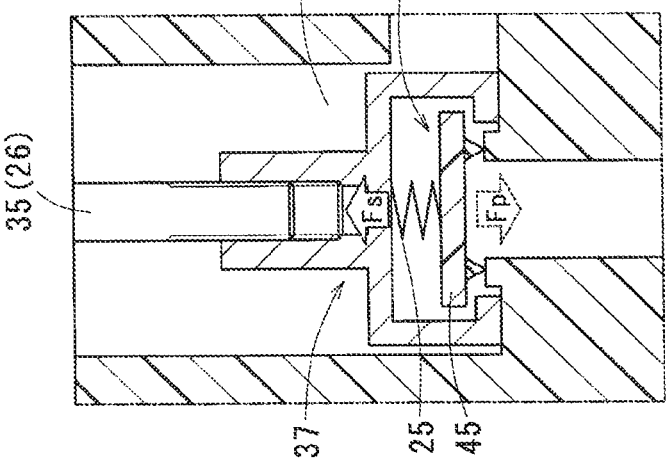
FIG. 7C illustrates an application force to the valve body guide in the open state with a negative fuel tank pressure.

With reference to FIG. 7C, in the open state, the only force acting on the valve body guide 37 is force Fp. The magnitude of the force Fp gradually decreases as the passage 27 opens.

Figure 8A:
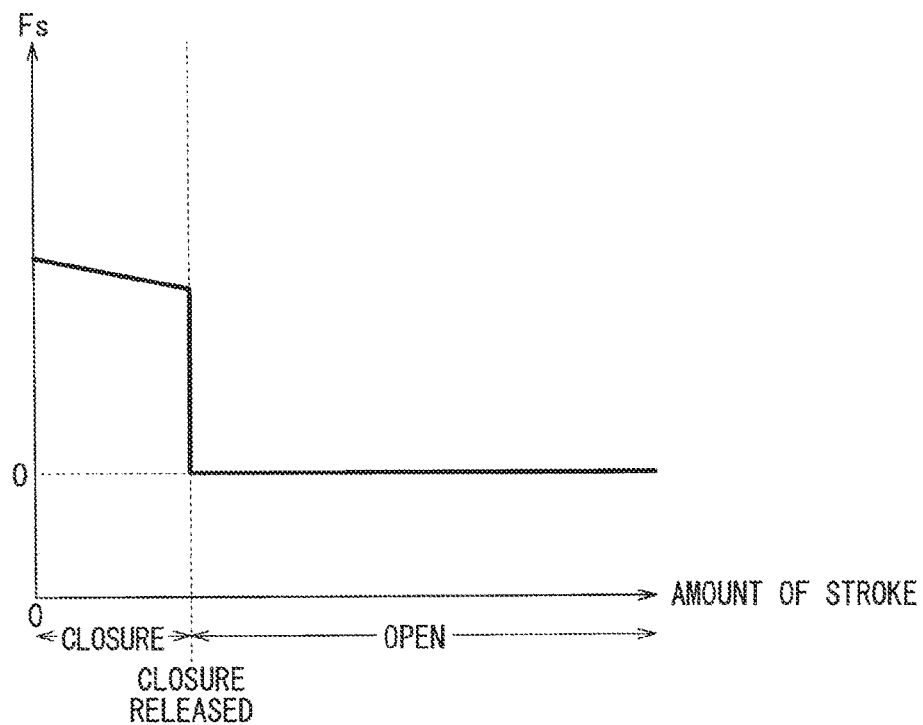
FIG. 8A is a graph of an application force from the biasing member to the valve body guide when the fuel tank is at a negative pressure.
Figure 8B:
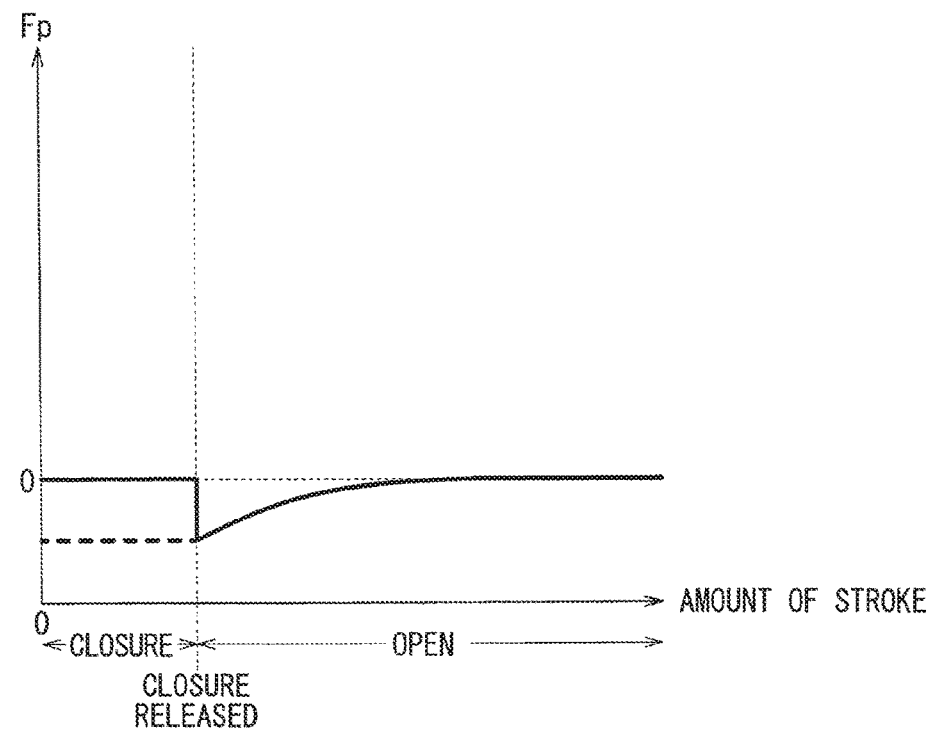
FIG. 8B is a graph of an application force on the valve body guide when the fuel tank is at a negative pressure.

In FIGS. 8A and 8B, the relationship between the forces Fs and Fp acting on the guide 37 and the stroke amount of the guide 37 is illustrated, in which an upward force is shown as a positive value and a downward force is shown as a negative value. In FIG. 8B, the broken line represents the force acting on the valve body 24.

In FIG. 9A, the forces acting on the valve body guide 37 are assumed as one force.

In FIG. 9B, the load of the output shaft 35, which is in proportion to an absolute value of the force acting on the guide 37, is illustrated. As shown in FIG. 9B, the load of the output shaft 35 largely changes in the closure release state.

Features of the First Embodiment

The features of the first embodiment are described with reference to FIG. 2.

The controller 1 has a driver circuit 50 for driving the driver 26.

The driver circuit 50 provides a square wave current signal (i.e., a rectangular-shaped current signal) to the driver 26, in response to an instruction signal from the CPU 9.

The controller 1 has a voltage detector 51 that detects a voltage applied to the driver 26. A drive voltage detected by the voltage detector 51 and applied to the driver 26 is sent to the CPU 9, and is used to detect the load of the driver 26.

The voltage detector 51 and the CPU 9 perform the functions of a detector and may be referred to herein as a detector 53. The detector 53 detects the load of the driver 26.

The CPU 9 also functions as a determiner 55 to determine the state and position of the valve body 24 and the valve body guide 37 to determine whether the passage 27 is closed or open. When the magnitude of change to the driver load is equal to or greater than a predetermined threshold value, the determiner 55 determines that the passage 27 has been opened.

In the first embodiment, when the internal pressure of the fuel tank 3 changes within a preset range, the controller 1 determines whether the load detection of the output shaft 35 by the detector 53 has been performed and also determines whether the determiner 55 has determined the state of the passage 27 (i.e., opened or closed).

The determinations performed by detector 53 and determiner 55 are performed while the leak detection device 19 performs its leak detection function.

There may be situations in which there is no change to the magnitude of the internal pressure of the fuel tank 3, for example, after a preset amount of time after stopping the vehicle. The stop state of the vehicle may be confirmed by the engine revolution sensor 14 or by detecting whether a vehicle key has been removed from the ignition switch.

When the pressure sensor 10 detects a negative internal pressure, the determination of the load by detector 53 is performed and the state of the passage 27 is determined by the determiner 55.

Effects of the First Embodiment

The controller 1 in the first embodiment is provided with the detector 53 to detect the load of the driver 26 and the determiner 55 to determine whether the passage 27 is in an open or closed state.

The determiner 55 determines whether the passage 27 has been opened when the magnitude of the change to the driver load is equal to or greater than a predetermined threshold value.

In such a way, the closure release position (i.e., detecting when the passage 27 is opened at the end of the region of play) may be accurately detected without detecting the change of the internal pressure of the fuel tank 3.

There is a detection delay in detecting the internal pressure change of the fuel tank 3 after the valve device 2 opens passage 27. That is, a certain amount of time may need to elapse after opening valve device 2 to open passage 27 before a change in the internal pressure of fuel tank 3 may be detected. However, since the change of the driver load may be detected almost instantaneously, the time to determine the closure release position of the valve device 2 may also be determined almost instantaneously.

As such, the closure release position of the valve device 2 and opening of the passage 27 may be determined very quickly using the apparatus described in the first embodiment.

Figure 10A:
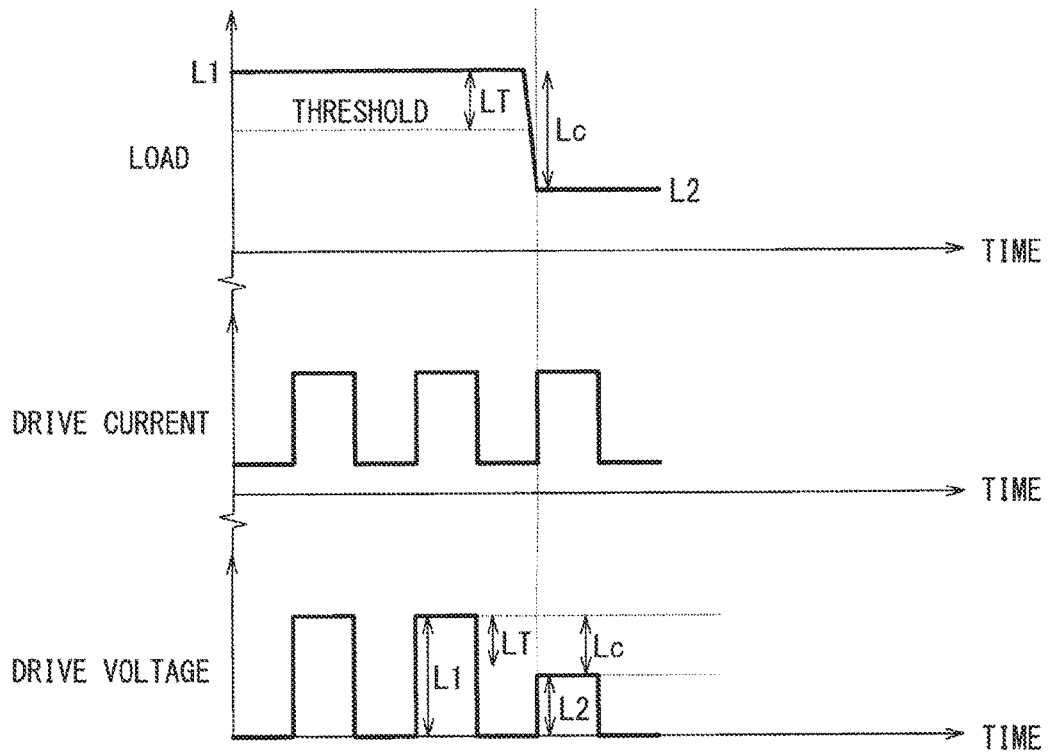
FIG. 10A is a graph of a load detection based on a drive voltage.
Figure 10B:
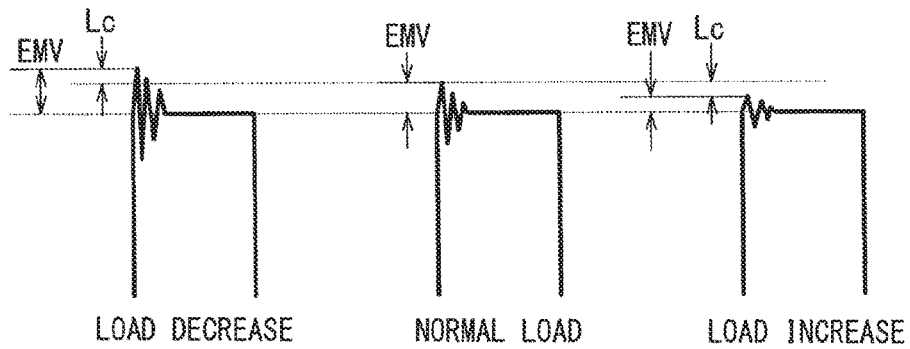
FIG. 10B is a graph of a load detection based on an electromotive force generated by a drive.

With reference to FIGS. 10A and 10B, an example showing the detection of the driver load by the detector 53 is shown. In FIGS. 10A, "L" corresponds to a load, in FIGS. 10A and 10B "Lc" corresponds to a change in magnitude of the load.

For example, when the driver 26 performs a constant current drive, a detection value of the drive voltage by the voltage detector 51 corresponds to the load of the driver 26.

A value corresponding to the magnitude of the driver load change is the magnitude of the change in drive voltage.

For example, since the drive voltage decreases when the load L of the driver 26 decreases, the amount of the drive voltage decrease can be used as the magnitude of the driver load change Lc, as shown in FIG. 10A. For example, the driver load may decrease from an L1 value to an L2 value such that the magnitude of the driver load change, i.e., Lc, is determined by the difference between the L1 and L2 values, that is, L1−L2=Lc.

The determiner 55 determines that the valve device 2 is in an open state and that the closure of the passage 27 has been released, when the magnitude of the driver load change is equal to or greater than a predetermined value or threshold level. As shown in FIG. 10A, the dotted line represents an arbitrary and exemplary threshold value. That is the magnitude of the driver load change between load L1 and the exemplary, predetermined threshold value may be defined as a load change threshold LT, such that when Lc is equal to or exceeds LT (i.e., Lc≥LT), the determiner 55 determines that the valve device 2 is in an open state. While the example shown in FIG. 10A shows the threshold value and the resulting magnitude as a single value, the threshold value is not limited to this example. For example, the threshold may be a range of values so that load change threshold LT is a range of values. Further, the relationship between the magnitude of the load change threshold LT and the magnitude of the driver load change may be modified, for example Lc>LT. The predetermined value or threshold level may be set in advance, that is, controller 1 may be programmed with the value or threshold level.

A correspondence between the magnitude of the electromotive voltage generated by the driver 26 using the drive voltage and the driver load can be made, such that the electromotive voltage can also be used as a corresponding indicator of the load of the driver 26.

With reference to FIG. 10B, example relations between electromotive voltage "EMV" and driver load are shown. In such case, when the load decreases, the rotation speed of the driver 26 increases and the electromotive voltage generated increases, or when the load increases, the rotation speed decreases and the electromotive voltage generated decreases. Therefore, an increase and decrease of the electromotive voltage can be used to indicate a corresponding change to the magnitude of the drive load.

The determiner 55 determines that the valve device is in an open position and state and that the closure of the passage 27 has been released, when the change in magnitude of the driver load is equal to or greater than a predetermined value.

In such manner, the change of the driver load can be detected and the closure release position of the valve device 2 can be accurately determined without the use of a separate torque sensor.

In the first embodiment, when the internal pressure of the fuel tank 3 fluctuates within a preset range, the controller 1 determines whether detector 53 detects a change of the load, and also determines if the determiner 55 has detected an opening of the passage 27, that is, determiner 55 detects a release of the closure of the passage 27.

In such manner, the closure release position can be determined in a state where the pressure inside of the fuel tank 3 is stabilized.

In the first embodiment, the determination of whether detector 53 and determiner 55 have performed their respective functions is made by controller 1 while the leak detection device 19 performs its leak detection of the fluid passages.

Since the leak detection is performed simultaneously with the closure release position determination, the total time for performing the two operations is decreased in comparison to a situation where the two operations are performed sequentially as separate operations.

When determining the closure release position of the valve device 2, nothing affects the internal pressure of the fuel tank 3. That is, since the closure release position may be determined instantly, that is, without increasing the amount or degree of valve the opening, the internal pressure of the fuel tank 3 remains unchanged, and the closure release state can immediately transition to the closure state so that the leak detection by the leak detector 19 will not be affected by the determination of the closure release position.

Further, even when the canister 4 is decompressed, the closure release position can be determined, since such decompression only affects the magnitude of the change of the driver load in the closure release state shown in FIG. 6B or 9B. In other words, the decompression of the canister 4 may change the length of the vertical line shown at the closure release position/state shown in FIGS. 6B and 9B without any effect on controller 1 detecting the closure release state. Therefore, the leak detection process and the determining the closure release position process may be separately and independently performed without one process affecting the other.

The detection of the load by the detector 53 and the determiner 55 determining whether closure of the passage 27 has been released may also be performed when the internal pressure detected by the pressure sensor 10 is a negative pressure.

Thereby, the outflow of the evaporative fuel to the canister 4 accompanying the opening (i.e., release of closure) of the passage 27 can be controlled/prevented, and the overflow of the evaporative fuel in the canister 4 can be controlled/prevented.

Features of the Second Embodiment

Figure 11:
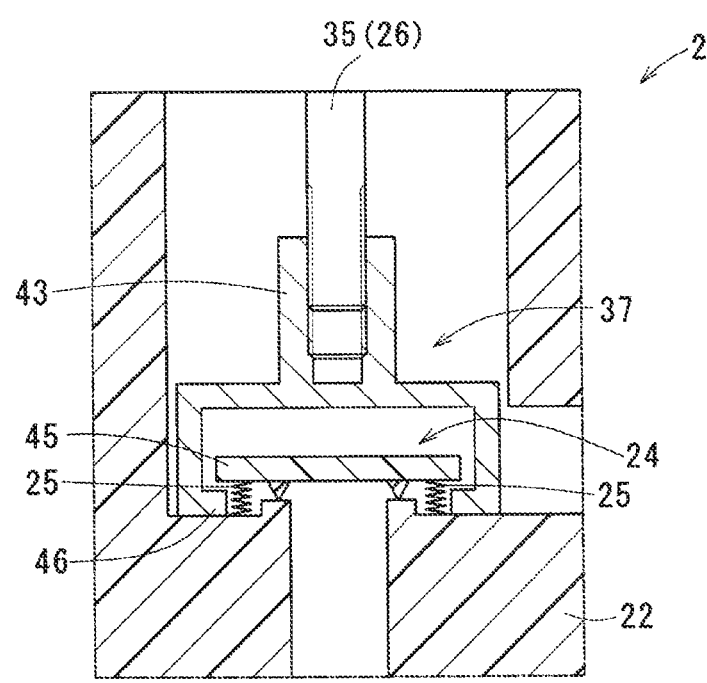
FIG. 11 illustrates a valve device.

Description of the valve device 2 in the second embodiment of the present disclosure is provided in the following with reference to FIG. 11, focusing on a portion of the device 2 different from the first embodiment. In the following, the same numbers are used for representing the same components among the first and second embodiments.

In the second embodiment, as for the biasing member 25, one end of the biasing member 25 is attached and fixed to the passage formation member 22. The valve device 2 may include one or more biasing members 25.

The biasing members 25 may be disposed equidistantly at the outer periphery of the undersurface of the base 45. Each of the biasing members 25 has one end fixed to the passage formation member 22 and the other end fixed to the undersurface of the base 45. In this arrangement, the biasing member 25 biases the valve body 24 downward.

As such, the biasing force by the biasing member 25 acts on the output shaft 35 even after the release of the closure. In other words, the biasing member 25 continues to exert a force on the valve body guide 37, and thus the output shaft 35 even after valve body 24 is positioned to open the passage.

Using such an arrangement, a backlash or other play (i.e., movement) between the threaded surface of output shaft 35 and internal threading of the stem part 43 may be limited and/or prevented.

Forces acting on the output shaft 35 in the configuration of the second embodiment are described, for the closure (i.e., closed) state/position, the closure release state/position, and the open state/position. The forces acting on the output shaft in each state/position may further be described in terms of instances where there is a positive internal pressure in the fuel tank 3 and a negative internal pressure in the fuel tank 3. In this embodiment, the canister 4 is at atmospheric pressure.

The positive internal pressure case, where the internal pressure of the fuel tank 3 is a positive pressure, is described with reference to FIGS. 12A, 12B, 12C, 13A, 13B, 14A, and 14B.

Figure 12A:
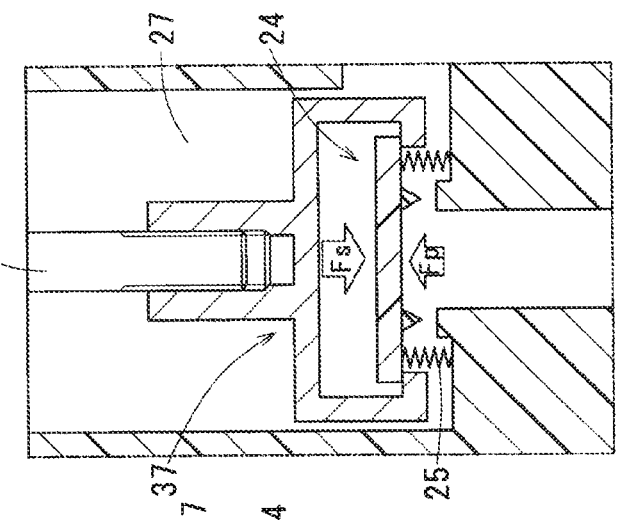
FIG. 12A illustrates an application force acting on the valve body guide in the closure state with the fuel tank at a positive pressure

With reference to FIG. 12A, in the closure state, the valve body 24 and the valve body guide 37 do not contact each other, and as such, there is no force from the valve body 24 acting on the valve body guide 37.

Figure 12B:
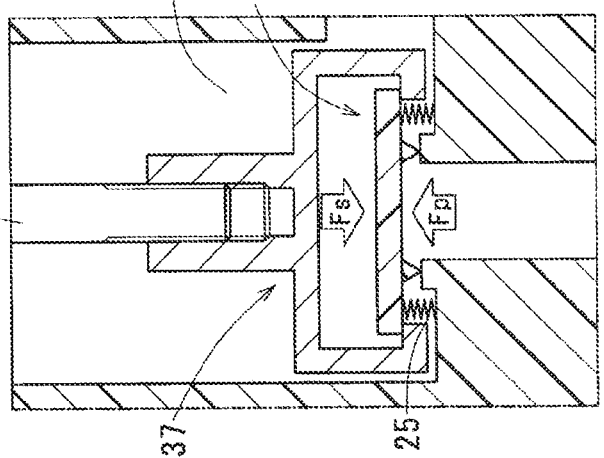
FIG. 12B illustrates an application force acting on the valve body guide in the closure release state with the fuel tank at a positive pressure.

With reference to FIG. 12B, in the closure release state, since the valve body guide 37 and the valve body 24 contact each other and move in combination as one body object, the force Fs exerts a force in a downward direction and the force Fp exerts a force in an upward direction.

Figure 12C:
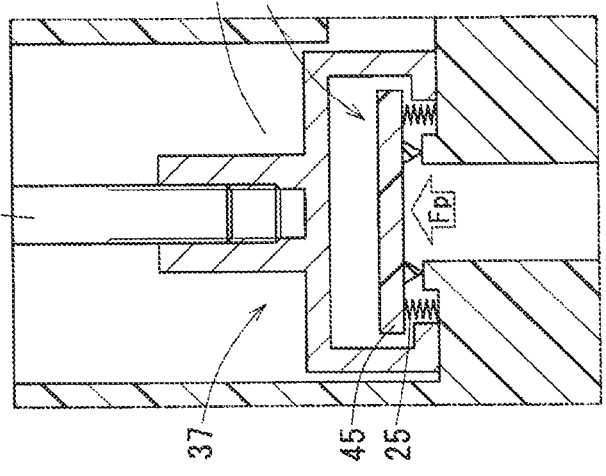
FIG. 12C illustrates an application force acting on the valve body guide in the open state with the fuel tank at a positive pressure.

With reference to FIG. 12C, in the open state, the force Fs acts downward and the force Fp acts upward on the valve body guide 37, similarly to the closure release state of FIG. 12B. However, in the open state, the magnitude of the force Fp gradually decreases with the opening of the passage 27, and a magnitude of the force Fs gradually increases with the amount of stroke.

Figure 13A:
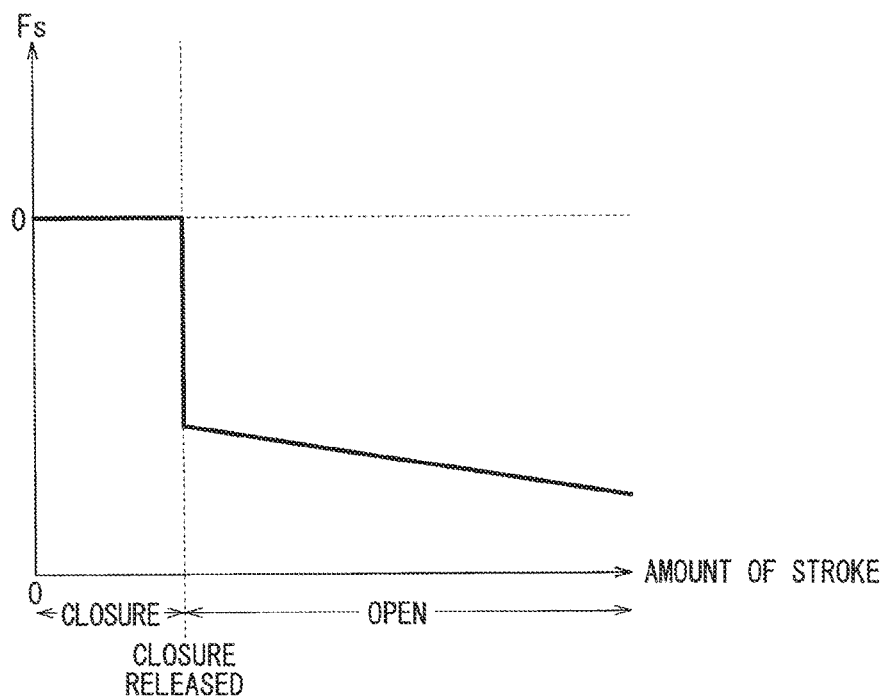
FIG. 13A is a graph of an application force from the biasing member acting on the valve body guide when the fuel tank is at a positive pressure
Figure 13B:
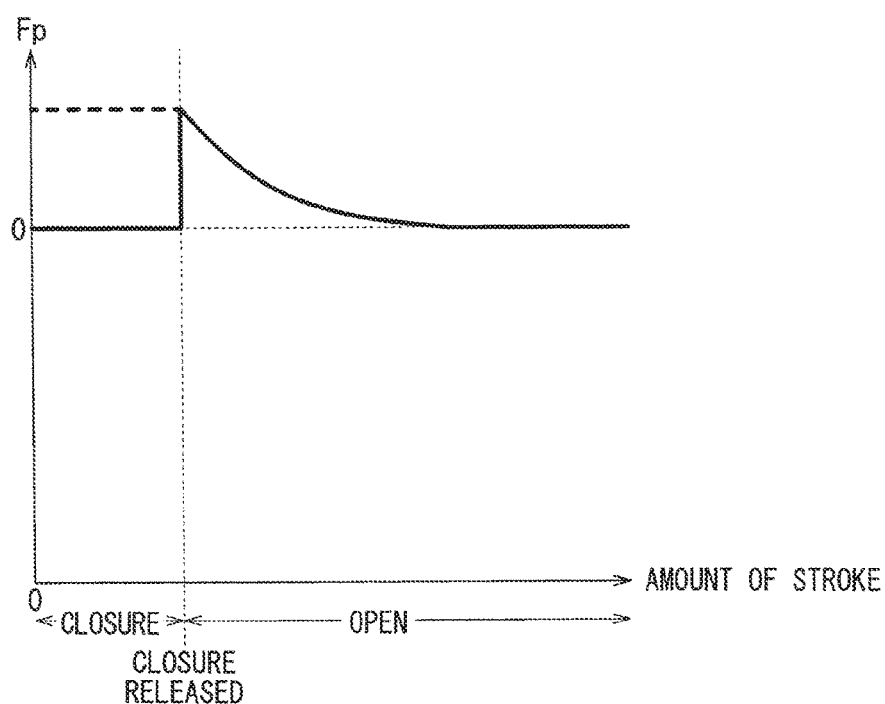
FIG. 13B is a graph of an application force acting on the valve body guide when the fuel tank is at a positive pressure.

In FIGS. 13A and 13B, a relationship between the forces Fs and Fp acting on the guide 37 and the amount of stroke of the guide 37 are illustrated, in which an upward force is shown as a positive value and a downward force is shown as a negative value. In FIG. 13B, the broken line represents the pressure force from fuel tank 3 acting on the undersurface of the valve body 24.

Figure 14A:
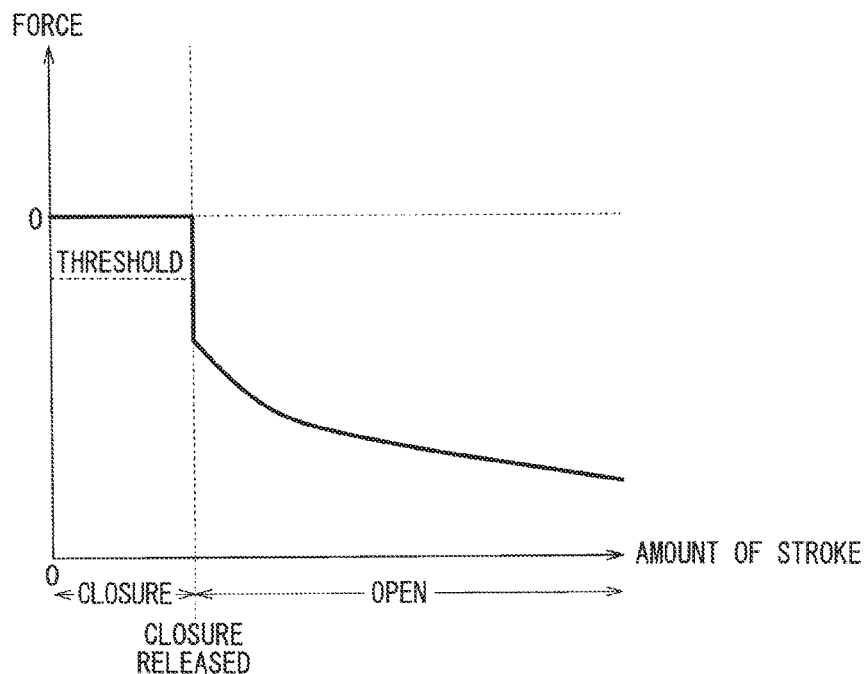
FIG. 14A is a graph of an application force acting on the valve body guide when the fuel tank is at a positive pressure.

In FIG. 14A, the forces (i.e., Fs and Fp) acting on the valve body guide 7 are assumed as one force (FORCE), that is FIG. 14A illustrates the forces acting on the valve body guide 37 as one force (FORCE).

Figure 14B:
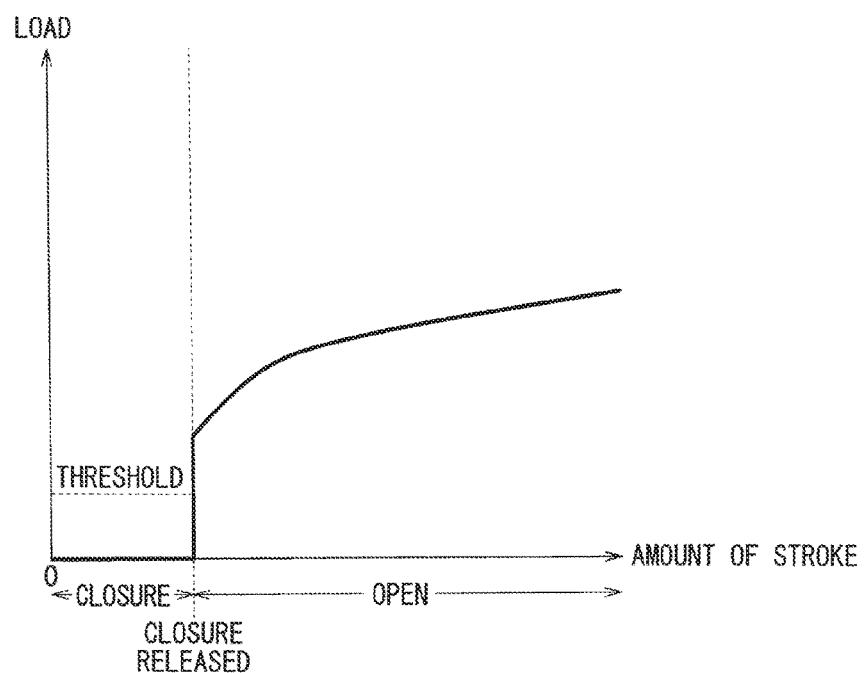
FIG. 14B is a graph of a load of the output shaft when the fuel tank is at a positive pressure.

In FIG. 14B, the load of the output shaft 35, which is in proportion to an absolute value of the combined forces acting on the valve body guide 37, is illustrated. As shown in FIG. 14B, the load of the output shaft 35 largely changes in the closure release state.

As described above, for example with reference to FIG. 10A, a threshold value may be provided to determine a magnitude of a load change threshold in order to detect when the valve device 2 (i.e., the valve body 24 and the valve body guide 37) transitions from the closure release state/position to the open state/position. An arbitrary and exemplary force threshold, and likewise the corresponding exemplary load threshold are shown by dotted lines respectively in FIGS. 14A and 14B. Controller 1 may use these threshold values to calculate the magnitude of a threshold change value between the load and the threshold value in order to determine when the valve device 2 transitions from the closure release state/position to the open state/position. As the illustrated threshold values in FIGS. 10A, 14A, and 14B are arbitrary and used for exemplary purposes, these exemplary threshold values are not shown in all of the drawings showing force, driver load, or the interrelationship between force and driver load, for example, in FIGS. 5A, 5B, 6A, 6B, 8A, 8B, 9A, 9B, 13A, 13B, 16A, 16B, 17A, or 17B.

FIGS. 15A, 15B, 15C, 16A, 16B, 17A, and 17B illustrate a negative internal pressure case where the internal pressure of the fuel tank 3 is a negative pressure.

In the closure state, the force from the valve body 24 acting on the valve body guide 37 is equal to 0, since the valve body 24 and the valve body guide 37 are independent from each other (i.e., do not contact each other) in the closure state.

In FIG. 15B, in the closure release state, the valve body guide 37 and the valve body 24 contact each other and move together as one body, and both of the force Fs and the force Fp exert downward forces on the guide 37.

With reference to FIG. 15C, in the open state, both the forces Fs and Fp exert downward forces on the valve body guide 37. The magnitude of the force Fp gradually decreases with the opening of the passage 27, and a magnitude of the force Fs gradually increases with the increase of the amount of stroke.

Figure 16A:
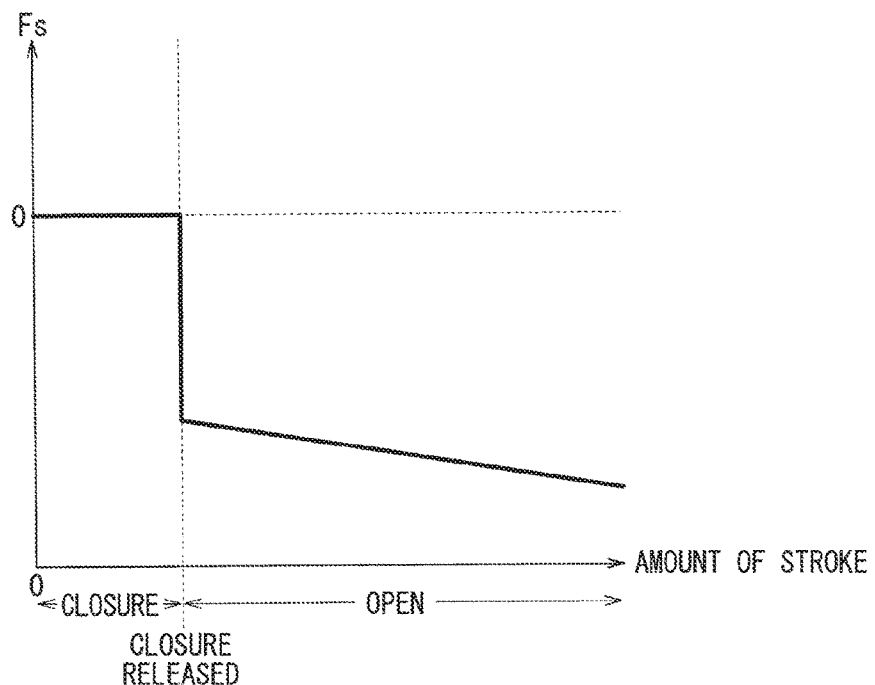
FIG. 16A is a graph of an application force by the biasing member to the valve body guide when the fuel tank is at a negative pressure.
Figure 16B:
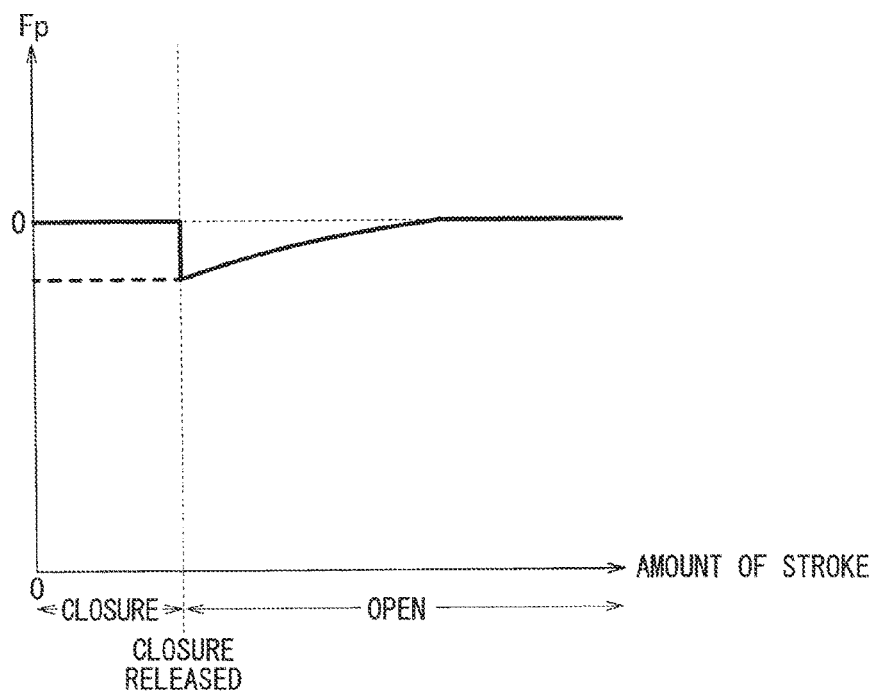
FIG. 16B is a graph of an application force acting on the valve body guide when the fuel tank is at a negative pressure.

In FIGS. 16A and 16B, the force Fs acting on the guide 37 is shown in FIG. 16A, and the force Fp acting on the guide 37 is shown in FIG. 16B. As shown in FIGS. 16A and 16B, upward acting forces have a positive value and downward acting forces have a negative value. The broken line in FIG. 16B represents the negative fuel pressure force acting on the surface of the valve body 24.

Figure 17A:
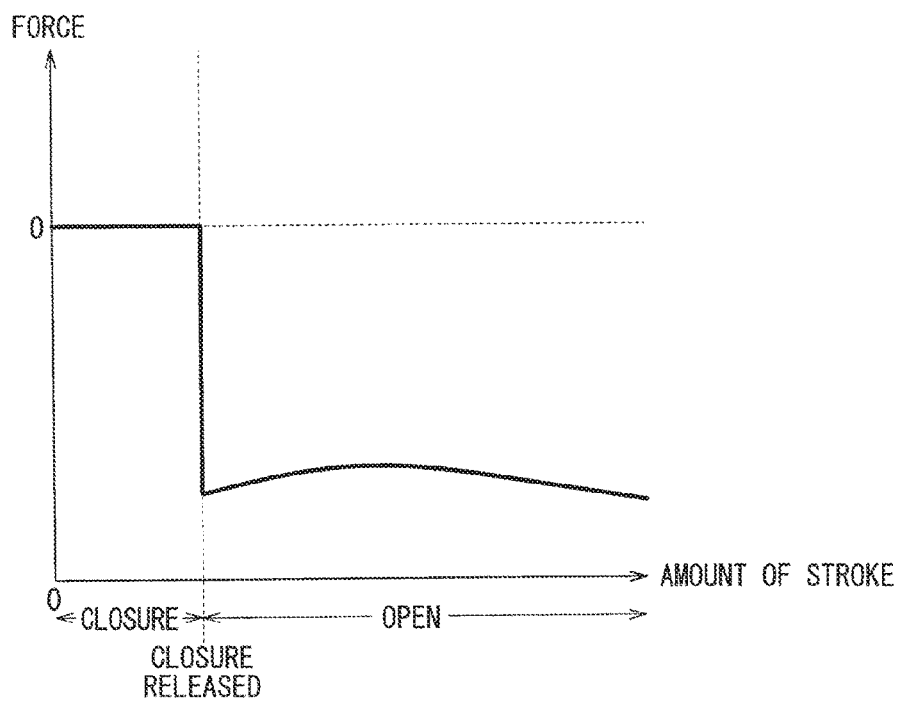
FIG. 17A is a graph of an application force acting on the valve body guide when the fuel tank is at a negative pressure.

In FIG. 17A, the forces acting on the valve body guide 37 are assumed as one force, i.e., a combination of forces.

Figure 17B:
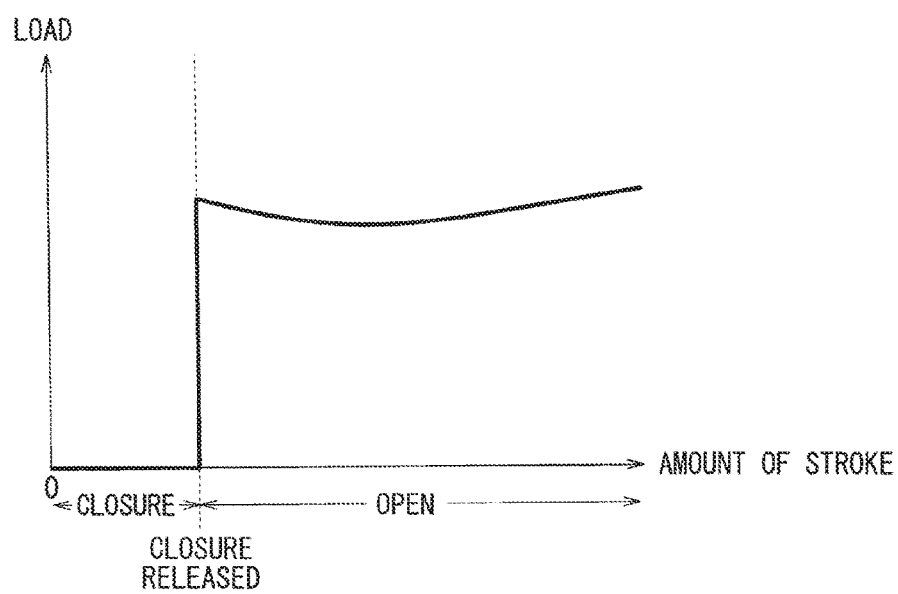
FIG. 17B is a graph of a load of the output shaft when the fuel tank is at a negative pressure.

In FIG. 17B, the load of the output shaft 35, which is proportional to the absolute value of the combined forces acting on the valve body guide 37, is illustrated. As shown in FIG. 17B, the load of the output shaft 35 largely changes in the closure release state.

When the internal pressure of the fuel tank 3 is a negative pressure, the magnitude of the load change increases to become very large, because the two forces acting on the guide 37 are both downward forces, thereby making it easier to determine whether the closure of the passage 27 has been released.

[Modification(s)]

The embodiments described above may be modified with various modifications in keeping with the spirit and scope of the above descriptions.

In the first embodiment, the driver 26 performs a constant current drive and the drive voltage is detected by the voltage detector 51. However, for example, a constant voltage drive may also be possible and the load may be detected based on the detection of the electric current by using a current detector.

In the first embodiment, the electromotive voltage generated in association with a drive is used for the load detection. However, the electromotive current generated in association with a drive may be used for the load detection.

In the first embodiment, the determiner 55 determines that closure of the passage 27 has been released, when the magnitude of the load change reaches, or is equal to or greater than, the predetermined threshold value set in advance. However, when the magnitude of Lc corresponding to change of the load reaches, i.e., is equal to or greater than, a predetermined value, it may be determined that closure of the passage 27 has been released.

Figure 18:
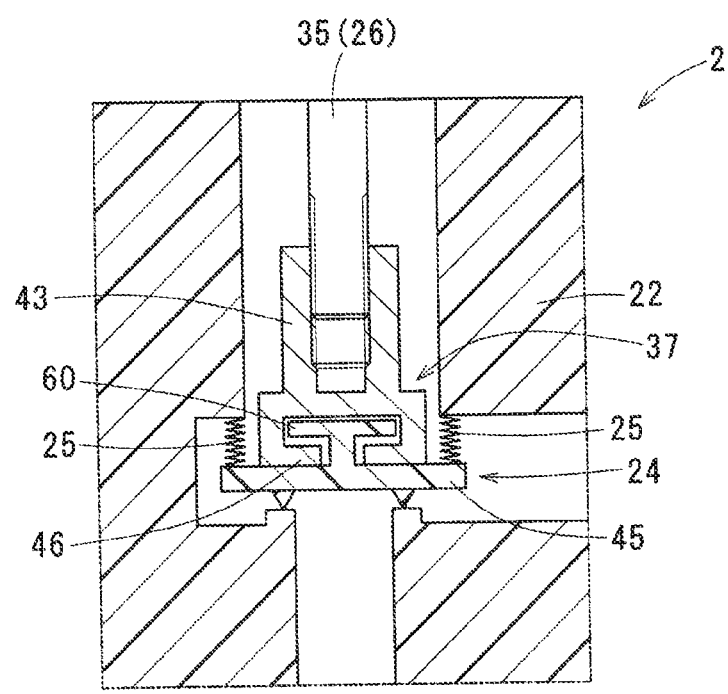
FIG. 18 illustrates a valve device.

In the second embodiment, one end of the biasing member 25 is fixedly attached to the passage formation member 22 and the other end thereof is fixedly attached to the undersurface of the base 45. However, the biasing member 25 may have its one end fixedly attached to the passage formation member 22, and may have its other end fixedly attached to an upper surface of the base 45, as shown in FIG. 18.

More specifically, two or more biasing members 25 may be equidistantly disposed on the outer periphery of the upper surface of the base 45. Each the biasing members 25 may have one end fixedly attached to the passage formation member 22, and the other end thereof may be fixedly attached to the upper surface of the base 45. In such arrangement, the biasing member 25 may provide a downward biasing force to the valve body 24. Note that, in the configuration of FIG. 18, the annular projection 46 engages with an outer periphery of a disk shape body 60 that extends from the upper face of the base 45, for driving the valve body 24 upward. The base 45 and the disk shaped body 60 of valve body 24 may be formed as one body, that is, as one part, without an additional attachment to attach disk shaped body 60 to the base 45.

Although the present disclosure has been described in detail in connection with preferred embodiments thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A controller configured to control an opening and a closing of a valve device, the controller comprising:
   a driver circuit configured to output a drive signal to a driver to control a driving of a valve body between a closed position, a closure release position, and an open position, and to release a closure of a valve passage by driving the valve body from the closure release position to the open position;
   a detector configured to detect a load of the driver; and
   a determiner configured to determine whether the closure of the valve passage is released; wherein
   the determiner determines that the closure of the passage is released when a magnitude of a change to the load of the driver is equal to or greater than a threshold value.

2. The controller of claim 1, wherein
   the drive signal output by the driver circuit to the driver is an electric power, and wherein
   the driver upon receiving the electric power generates a driving force, and wherein
   the detector detects the load based on an electromotive force generated either by a drive voltage, a drive current, or a drive of the driver.

3. The controller of claim 1, wherein
   the controller is further configured to receive an input from a pressure sensor, the pressure sensor detecting an internal pressure of a fuel tank, and wherein
   the detection of the load by the detector and the determination by the determiner are performed when the controller detects a negative pressure value.

4. The controller of claim 1, wherein
   the controller is further configured to receive an input from a pressure sensor, the pressure sensor detecting an internal pressure of a fuel tank, and wherein
   the detection of the load by the detector and the determination by the determiner are performed when the controller detects that a change of an internal pressure of the fuel tank is within a preset range.

5. The controller of claim 4, wherein
   the controller is further configured to control a leak detection device, the leak detection device configured to perform a leak detection process, and wherein
   the detection of the load by the detector and the determination by the determiner are performed during the leak detection process.

6. A valve control system configured to control an opening and closing of a valve device, the system comprising:
   a passage formation member defining a fuel passage for a flow of evaporative fuel from a fuel tank;
   a valve body disposed within the passage and configured to move between a closed position, a closure release position, and an open position to control the flow of evaporative fuel through the passage;
   a biasing member in connection with the valve body and configured to provide a biasing force to bias the valve body to the closed position;
   a driver configured to output a driving force to drive the valve body between the closed position, the closure release position, and the open position, the driver further configured to release a closure of the valve passage by driving the valve body from the closure release position to the open position;
   a driver circuit configured to output a drive signal to the driver for driving the valve body;
   a detector configured to detect a load of the driver; and
   a determiner configured to determine whether the closure of the valve passage is released, wherein
   the driver releases the closure of the passage when the driving force to drive the valve body exceeds the biasing force, and wherein
   the determiner determines that the closure of the passage is released when a magnitude of a change to the load of the driver is equal to or greater than a threshold value.

7. The valve control system of claim 6, wherein
   an end of the biasing member is fixedly attached to the passage formation member.

* * * * *